Nov. 6, 1956  I. B. HUMPHREYS  2,769,433
INTERNAL COMBUSTION ENGINE
Filed May 11, 1949  2 Sheets-Sheet 1

INVENTOR.
I. B. HUMPHREYS
Pattison, Wright & Pattison
ATTORNEYS

Nov. 6, 1956  I. B. HUMPHREYS  2,769,433
INTERNAL COMBUSTION ENGINE
Filed May 11, 1949  2 Sheets—Sheet 2

INVENTOR.
I.B. HUMPHREYS
BY
Pattison, Wright & Pattison
ATTORNEYS

United States Patent Office 2,769,433
Patented Nov. 6, 1956

2,769,433
INTERNAL COMBUSTION ENGINE

Ira B. Humphreys, Denver, Colo., assignor to The Humphreys Investment Company, Denver, Colo., a corporation of Colorado Application May 11, 1949, Serial No. 92,710

8 Claims. (Cl. 123—48)

This invention relates to internal combustion engines but more particularly and specifically to a construction or arrangement built either as a part of the original engine or affixed thereto as an attachment, which renders the engine more efficient and economical of fuel consumption.

By the use of high compression ratios in an internal combustion engine both fuel economy and engine power are increased. This fact has been common knowledge and accordingly for a number of years the trend in engine design has been toward engines having higher compression ratios. This trend however has been limited by the non-detonating properties, that is, octane rating, of fuels which are commercially available. It is also common knowledge that the full advantages of a high compression ratio engine, as engines are built today, are available only at relatively open throttle conditions or high power demand and that at less than such conditions or demands there is no advantage either in fuel economy or engine power in the use of extra high octane fuels which permit the higher compression ratio engines. This is so because at low throttle settings only a partial or small fuel-air charge is admitted or drawn into the combustion chamber of the engine which fact lowers the effective compression ratio of the engine. In other words, in a conventional engine having, for instance, a 7½ to 1 compression ratio the "effective ratio" or actual compression pressure will, at low or partial engine throttle settings, be far below 7½ to 1.

From the foregoing it will be seen therefore that in a conventional engine with a fixed compression ratio in the commonly accepted sense this engine will at full or nearly full throttle utilize the fuel properties to full advantage to obtain fuel economy and engine power but at lesser throttle settings the effective compression ratio of the engine is decreased with a consequent and material reduction in efficiency.

Broadly the present invention comprises and embodies an engine construction which during the operation of the engine maintains a constant compression pressure by automatically increasing and decreasing the volumetric capacity of the combustion chamber of the engine, to thereby provide an engine the fuel economy and efficiency of which is materially increased.

In the maintenance of a predetermined maximum compression pressure in the engine combustion chamber the present invention in general comprises providing a portion of the wall of the engine combustion chamber in the form of an element which is movable outwardly and inwardly in respect to the combustion chamber to increase and decrease the volumetric capacity of the chamber. This movable wall element is backed up by a body of fluid which is confined within a compartment or container. When the combustion pressure in the combustion chamber exceeds a predetermined maximum a portion of this fluid is allowed to escape and thus permit an outward movement of the movable wall element which movement continues until the pressure in the combustion chamber is at the predetermined maximum. A delivery of fluid to the fluid confining compartment is available under low pressure for maintaining the movable combustion chamber wall element in the proper position to maintain the predetermined compression pressure in the combustion chamber and to keep the fluid confining compartment behind the movable wall element filled with fluid. As a consequence of this arrangement if the compression pressure in the combustion chamber falls below the predetermined maximum, by reason of a reduction in throttle setting or any other cause, the movable wall element of the combustion chamber will move inwardly towards the chamber the proper distance to make the volumetric capacity of the combustion chamber proportionately proper in respect to the fuel-air intake to establish the predetermined compression pressure.

Internal combustion engines of the general type above referred to are not new. Numerous patents have been issued upon such engines but those arrangements thus far conceived have not proved successful in commercial use and particularly so in connection with engines which are suddenly and violently accelerated such as for instance engines in automobiles and airplanes. Devices as heretofore conceived and patented have numerous and critical shortcomings which make them unsuited for practical and commercial usage and it is these deficiencies which are overcome by the present invention which provides a novel and improved construction and one which is commercially practical and usable.

One of the features common to many prior devices is the constant application of a pressure, which equals or is greater than the top engine combustion pressure, to a body of fluid, confined in a compartment or container, which backs up a movable wall which constitutes a portion of the combustion chamber of an engine. In the present arrangement there is, by comparison, substantially no pressure upon the body of fluid backing up the movable combustion wall element of the engine.

Another feature common to prior devices is that when the fluid backing up the movable wall portion of the engine combustion chamber is allowed to escape, as it must when the wall moves outwardly to prevent the generation of a compression pressure greater than the predetermined maximum, the discharge of the fluid from its confining compartment or container is not free and rapid but to the contrary the prior arrangements have been such that the combustion pressures built up in the combustion chamber are generated in the fluid within the compartment and the column of outwardly moving or escaping fluid.

In the present device the fluid discharged from the fluid compartment discharges, that is escapes, freely into a receiving and conveying receptacle and conduit at atmospheric pressure and the arrangement and construction is such as to reduce to the greatest possible degree any resistance to the free discharge of the fluid so that it can escape against substantially no pressure and so that no back pressure will be generated in the column of fluid after the fluid has passed from the compartment.

Another feature found in prior devices is an arrangement which does not prevent air or gas from being trapped in the fluid container or compartment or the fluid column escaping therefrom. In the present device provision is made to assure that no air or gas is trapped in the fluid by preventing entrapment of air or gas in the fluid container, the escaping fluid reception compartment, or the escape conduit or passageway for said fluid.

Still another feature found in and common to prior art devices is the inability of said devices to respond or act with sufficient rapidity in response to violent or rapid change of engine throttle settings and particularly in respect to violent or sudden higher throttle settings. In the present device the construction and arrangement are such that the response and action of the compression controlling device will with sudden changes in engine throttle setting practically instantaneously function to assure the maintenance of the predetermined compression pressure and prevent knocking, that is detonation or preignition, upon sudden and violent increased throttle settings.

The foregoing enumerates the most obvious objects and benefits of the invention but other objects, benefits, advantages and novel features of construction of the invention will appear from the following description when read in the light of the accompanying drawings.

The drawings illustrate, to some degree diagramatically, a construction by which the inventive concept can be practiced but structural departures from the constructions illustrated can be made without departure from the inventive concept.

The present invention is applicable for use in connection with any engine of the internal combustion type whether the same be two or four cycle and irrespective of the number of cylinders embodied in the engine and can be used with any and all kinds of engine operating fluids or fuels irrespective of the particaular anti-knock characteristics or octane rating thereof.

Figure 1:
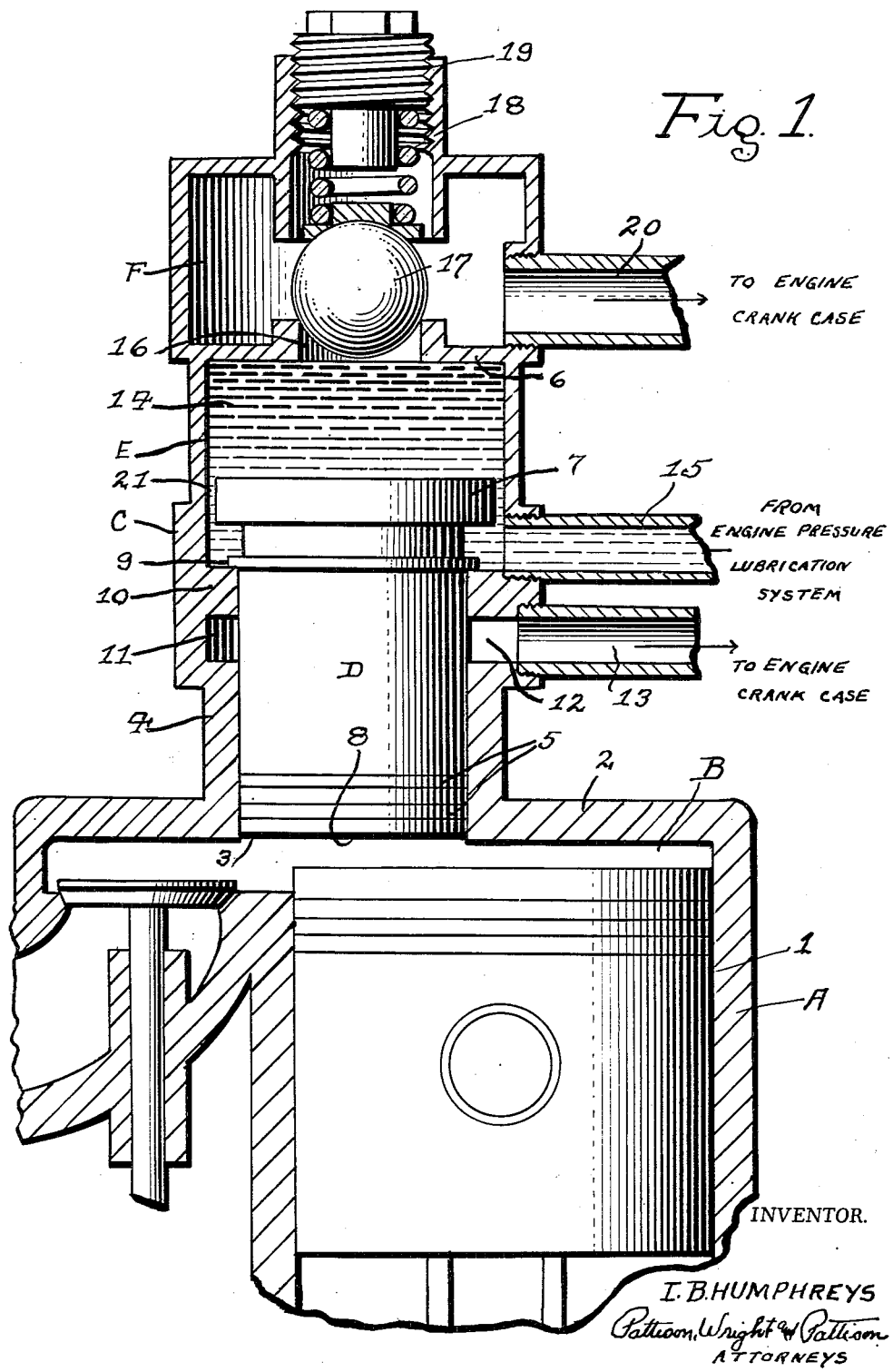
Fig. 1 is a vertical sectional view of an internal combustion engine cylinder which embodies the present invention.

Having reference to Fig. 1, A designates a cylinder of an engine having therein a reciprocatory piston 1. The usual combustion chamber B exists or is present between the head of the piston and the head 2 of the cylinder. The rest of the engine, not illustrated, can be constructed in accordance with good engineering principles and it is assumed, although this is not necessary as will later be pointed out, that the engine is provided with a pressure type lubricating system.

The compression pressure control unit now to be described constitutes the invention and can be built into the engine at the time of original manufacture or can, as will be readily apparent, be provided as an attachment to a previously completed engine. In the case of a multi-cylinder engine a compression pressure control unit will be provided for each cylinder of the engine.

The engine cylinder head instead of being, as usual, imperforate is provided with an opening 3 which is preferably, although not necessarily, cylindrical in shape. A supplemental cylinder C, hereinafter referred to as a control cylinder, is superimposed upon the engine cylinder head 2. The control cylinder can be made as an integral part of the engine cylinder head, as shown, or as a separate unit suitably attached to the engine cylinder head. The lower end of the control cylinder is open and is in communication with the engine cylinder through the cylinder head opening 3. The part 4 of the control cylinder constitutes the barrel or cylinder for the lower portion of a control piston D which is provided with rings 5. The upper end of the control cylinder is of enlarged diameter to form a compartment E the outer end of which is closed by a head 6. The piston is provided with an enlarged head 7 positioned in the compartment E and the piston is reciprocal so that its lower inner end 8 is movable away from and toward the engine combustion chamber B.

In the hereinafter following claims this piston D is referred to as a movable combustion chamber wall element. This broad terminology is utilized because the element need not be in the form of a piston as it could conceivably be in the nature of a diaphragm or some other movable element.

The piston D is of considerable length and its lower end fits snugly yet reciprocably movable within the barrel 4. The enlarged head 7 of the piston is of lesser diameter than the upper compartment portion E of the cylinder within which compartment the piston head moves when the piston is reciprocated.

At a short distance beneath its head the piston D is provided with a circumferential flange 9 or the equivalent. This flange acts as a piston stop in that it engages a circumferential flange 10 provided in the cylinder. When the flanges 9 and 10 are in abutment the piston is in its lower or innermost position and its inner or lower end 8 is substantially flush with the inner face of the main engine cylinder head 2.

The control cylinder intermediate its length is internally provided with a circumferential channelway 11 having communication at 12 with an escape conduit 13. Any air or gas or similar pressure medium passing from the combustion chamber B of the engine upwardly between the supplemental piston D and the wall 4 of the barrel will be trapped by the channelway 11 and discharged from the conduit 13 thus preventing the passage, and subsequent entrapment of this medium in the compartment E above the head 7 of the supplemental piston.

The compartment E is filled with oil 14 or a substantially equivalent fluid. This oil is present also at the sides of the supplemental piston head 7 and between the underside of said head and the upper face of the control cylinder flange 10. As a consequence this oil rests upon the piston flange 9. An oil supply conduit 15 communicates with the compartment E and with the parts in the positions illustrated this conduit 15 discharges into the compartment at a point between the piston flange 9 and the underside of the piston head 7.

Preferably, but not necessarily, this oil is delivered through the supply conduit 15 by the pressure pump of the lubricating system of the engine. Such pumps ordinarily deliver fuel at from 10 to 40 pounds pressure and have a relief valve set to open at between 30 to 40 pounds pressure. This is ordinarily an adequate pressure for the practice of the present invention as it is not only unnecessary but undesirable to deliver oil at any really appreciable pressure poundage. The device operates with oil which is supplied at a very low pressure as will hereinafter clearly appear.

The head 6 of the control cylinder compartment portion E is provided with an outlet 16 normally closed by a ball or other suitable type valve 17 which is held in its closed position under the tension of a spring 18 the load of which is adjustable through the medium of a set screw 19. The loading on the valve 17, that is the tension of the spring 18, will be set to permit the valve 17 to open when a predetermined maximum combustion pressure is reached in the combustion chamber B of the engine.

The outlet 16 of the compartment E communicates immediately with a receptacle F which is of considerable capacity with the result that oil can, after the valve 17 has opened, discharge freely with substantially no hindrance or deterrence whatsoever. In a multi-cylinder engine the receptacle F could be in the form of a manifold connecting the several cylinders. The exact form of the compartment is unimportant other than it be such that the oil passing through the outlet 16 can flow freely into it. The receptacle F is normally empty as it is at its bottom provided with an outlet conduit 20 which communicates with the crank case or other lubricant receptacle of the engine. It is to be noted that the outlet 16 is of very considerable size so that there will be the least possible restriction of escape of oil through it.

It is to be understood that the hydraulic system of the device need not of necessity be hooked into the lubricating system of the engine. A separate system could be set up and would need only the provision of a reservoir for the oil and a pump for delivering oil therefrom to the control cylinder compartment E through the supply conduit 15.

Attention is directed to the fact that the incoming delivery of oil through the pipe 15 is to the annular space beneath the control piston head 7 and that oil delivered to this space passes upwardly into the control cylinder compartment portion E through the space 21 between the piston head 7 and the wall of the compartment. Attention is also called to the fact, as will hereinafter again be referred to, that although oil is available at all times for delivery to the oil confining compartment E of the control cylinder oil is not being constantly delivered into this compartment. The oil is delivered at a very low pressure and accordingly will pass into the control cylinder only during the exhaust, intake and low pressure parts of the engine cycle, that is, only when the pressure exerted upon the control piston D by the pressure within the engine combustion chamber is less than the delivery pressure on the oil.

Having reference now to the operation of the device and assuming for the purposes of description that the fuel being used has an anti-knock characteristic which will permit a compression ration of 7 to 1 then the spring 18 above the control or relief valve 17 will be loaded to permit this valve to open when the pressure exerted upon the oil body 14 by the combustion pressure within the engine combustion chamber is at a point or poundage which is slightly below the pressure poundage which will exist in the combustion chamber as a result of a 7 to 1 compression.

With the parts in the positions illustrated the control piston D is at the bottom or limit of its inward movement and the engine throttle is partly open. Upon a further opening of the engine throttle the combustion pressure within the combustion chamber will increase and when this pressure reaches the pressure setting of the spring 18 the control piston D will be forced upwardly or outwardly and force oil from the control piston compartment 14. This upward or outward movement of the control piston and the discharge of oil from the compartment will continue until the pressure within the combustion chamber has decreased to a point that it will be overcome by the loading of the spring 18 whereupon the spring will cause the valve 17 to close.

Obviously the upward or outward movement of the control piston increases the volumetric capacity of the engine combustion chamber and this movement is automatically proper in amount to maintain the predetermined compression pressure within the engine combustion chamber.

With the throttle remaining at a set position there is a slight inward and outward fluctuation of the control piston D due to the fact that during the exhaust, intake and extremely low pressure parts of the engine cycle a small quantity of oil will be delivered through the oil supply conduit 15 and a small amount of this oil will move upwardly by the control piston head 7 through the space 21. The oil thus delivered will move the control piston down or inwardly a slight distance but upon the next compression and combustion cycle of the engine the control piston will be moved up or outwardly very slightly to compensate for the aforesaid inward or downward movement thereof. During this upward or outward movement of the control piston a small quantity of oil may escape either because the control or relief valve 17 may be caused to open or by escape outwardly through the liquid supply pipe 15 which it reaches by travelling downwardly through the space 21 around the control piston head 7 into the annular space below this head. However from a practical standpoint the control piston D during a constant throttle setting is practically stationary.

Whenever the throttle is moved from an open toward a closed position the incoming oil through the conduit 15 will cause the control piston D to move inwardly. Obviously due to the low pressure of the incoming oil, oil will be delivered only during the exhaust, intake and low pressure parts of the engine cycle but the inward movement of the control piston will continue until the proper predetermined compression pressure is reached within the combustion chamber of the engine.

Any oil leakage from the compartment E inwardly along the control piston D will be trapped by the channelway 11 and be discharged through the outlet conduit 13. If desired the conduit 13 can be connected to drain into the crank case or other oil reservoir of the engine.

Figure 2:
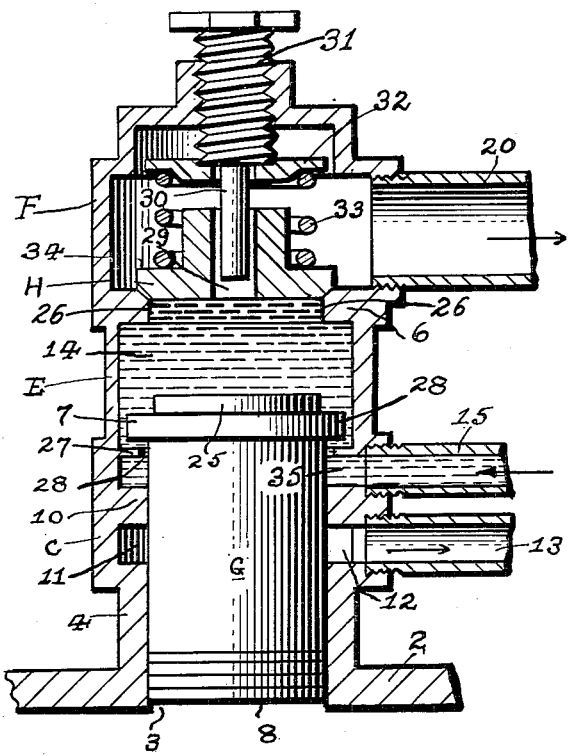
Fig. 2 is a view similar to Fig. 1, illustrating a modified form of the invention.

A slightly modified form of the invention is illustrated in Fig. 2 of the drawings wherein like parts to those previously described are given similar reference characters and numerals. In this construction the previously described control piston circumferential flange 9 has been eliminated and the head 7 of the piston G is provided with an extension 25 which is of proper diameter to enter the escape outlet 26. The control cylinder flange 10 previously described has been altered to provide a flange 27 which stops short of the side of the piston G to provide a circumferential restricted passageway 28.

The previously described ball valve has been replaced by a valve H having a central passage 29 for the reception of a guide pin 30 which depends from the lower end of the adjusting screw 31. This pin passes through a washer 32 which abuts the lower end of the adjusting screw and forms an abutment for the upper end of a coil spring 33 the lower end of which rests upon the flange 34 of the valve H.

In operation this form of the invention is substantially the same as previously described with the exception that the incoming oil through the pipe 15 enters the annular space 35 and passes upwardly through the restricted passageway 28. This restricted passageway into and out of the compartment E above the control cylinder provides a better dashpot under the piston head. Additionally the extension 25 on the top of the piston head forms a dashpot for the reason that when the control piston G is forced to the top of its movement this extension enters the outlet passageway 26 and forms a dashpot between the main piston head 7 and the compartment head 6.

Engines, and particularly engines in automotive vehicles and airplanes, are rapidly accelerated and decelerated and consequently it is of the greatest importance to provide a device which operates with sufficient rapidity that it will constantly maintain the predetermined compression pressure. In the accomplishment of this it is necessary that the oil escape rapidly and unrestrictedly from the confining compartment of the control cylinder. Provision for this in the present device has been made, as hereinbefore explained. The present control unit will constantly, throughout the limit of travel of the control piston D, maintain the predetermined compression pressure of the engine.

The advantages derived from being able to maintain a substantially constant compression pressure are so obvious to those skilled in this art as to need no further specific description or enumeration. The present invention provides all of these advantages in a practical and commercially operable apparatus.

What I claim is:

1. In an internal combustion-type engine having a combustion chamber, means for automatically increasing and decreasing the volume of the combustion space within the chamber said means comprising, a compartment having an open lower end communicating with the combustion chamber, a control piston closing the lower end of the compartment and movable therein toward and away from the combustion chamber, the upper end of said compartment being provided with an outlet opening, a valve normally closing said opening, the control piston provided with a head disposed in the upper end of the compartment but of lesser diameter than the upper end of the compartment, means in the compartment engageable by said piston head to limit the travel of the control piston in a direction toward the combustion chamber, a fluid confined in the upper end of the compartment and filling the same, yieldable means holding the valve against opening only in response to a predetermined degree of pressure exerted upon it by the confined fluid, means for delivering fluid to the compartment at a point beneath the head of the control piston, and said fluid delivery means operating to deliver fluid to the compartment at a pressure less than the highest pressure obtained in the combustion chamber.

2. In an internal combustion-type engine having a combustion chamber, means for automatically increasing and decreasing the volume of the combustion space within the combustion chamber comprising, a cylinder having an inner portion having an open inner end communicating with the combustion chamber, a control piston snugly fitting but reciprocable in the inner portion of the cylinder, the cylinder having an outer portion of enlarged diameter filled with a body of fluid and provided with an outlet passageway, a normally closed valve controlling said outlet, yieldable means holding said valve against opening only in response to a predetermined degree of pressure exerted upon it by the fluid, a fluid receptacle immediately adjacent the valve and communicating with the outlet passageway and having sufficient capacity to insure a free unrestricted and unopposed flow of fluid discharged from the outlet passageway, the control piston being provided with an enlarged head loosely fitting the outer portion of the cylinder, and means constantly in communication with the inner end of the outer portion of the cylinder at a point behind the control piston head for delivering fluid to the cylinder.

3. A construction as defined in claim 2 wherein, the control piston is provided with an extending head portion of reduced diameter and of a size to fit within the control cylinder outlet passageway, the parts acting whereby a dash pot action is provided at the end of each direction of reciprocation of the control piston.

4. A construction as defined in claim 2 wherein, the control piston is provided with an extending head portion of slightly less diameter than the diameter of the piston, and the outlet passageway being of a diameter slightly greater than the extending head portion of the control piston and adapted to receive said control piston portion when the control piston is reciprocated outwardly from the combustion chamber.

5. In an internal combustion-type engine having a combustion chamber, means for automatically increasing and decreasing the volume of the combustion space within the chamber said means comprising, a compartment having an open lower end communicating with the combustion chamber, a control piston closing the lower end of the compartment and movable therein toward and away from the combustion chamber, the upper end of said compartment being provided with an outlet opening, a valve normally closing said opening, the control piston provided with a head disposed in the upper end of the compartment but of lesser diameter than the upper end of the compartment, a fluid confined in the upper end of the compartment and filling the same, yieldable means holding the valve against opening only in response to a predetermined degree of pressure exerted upon it by the confined fluid, means for delivering fluid to the compartment at a point beneath the head of the control piston, and said fluid delivery means operating to deliver fluid to the compartment at a pressure less than the highest pressure obtained in the combustion chamber.

6. In an internal combustion-type engine having a combustion chamber, means for automatically increasing and decreasing the volume of the combustion space within the chamber said means comprising, a compartment having an open lower end communicating with the combustion chamber, a control piston closing the lower end of the compartment and movable therein toward and away from the combustion chamber, the upper end of said compartment being provided with an outlet opening, a valve normally closing said opening, the control piston provided with a head disposed in the upper end of the compartment, means to limit the travel of the control piston in a direction toward the combustion chamber, a fluid confined in the upper end of the compartment and filling the same, yieldable means holding the valve against opening only in response to a predetermined degree of pressure exerted upon it by the confined fluid, means for delivering fluid to the compartment at a point beneath the head of the control piston, a fluid delivery and conducting means communicating with the compartment at a point below the control piston head, means to convey delivered fluid past the control piston head into the compartment thereabove, and said fluid delivery and conducting means being constantly in open communication with the compartment and operating to deliver fluid to the compartment at a pressure less than the highest pressure obtained in the combustion chamber.

7. In an internal combustion-type engine having a combustion chamber, means for automatically increasing and decreasing the volume of the combustion space within the chamber, comprising a control piston the inner end of which forms a portion of a wall of the combustion chamber and is movable outwardly and inwardly in respect to the chamber, a cylinder for said control piston, said cylinder above the head of the control piston being filled with and confining a body of fluid, the cylinder being provided with an outlet, a normally closed valve controlling said outlet, yieldable means holding the valve against opening only in response to a predetermined degree of pressure exerted upon it by the confined fluid, fluid reception and conducting means into which fluid in the cylinder can when the valve is open substantially free of opposition rapidly escape, the fluid reception means comprising a receptacle immediately adjacent the outer valve and having sufficient capacity to insure the said absence of opposition of escape of the fluid discharged through the valve, means constantly in open communication with the cylinder for delivering fluid to the cylinder to move the control piston inwardly when a drop in combustion pressure occurs, the control piston being provided with an extending head portion of a reduced diameter and of a size to fit within the control cylinder outlet to provide a dash pot action when the control piston head approaches the end of its outward travel, and said fluid delivery means operating to deliver fluid to the cylinder at a pressure less than the highest pressure obtained in the combustion chamber.

8. In an internal combustion-type engine having a combustion chamber, means for automatically increasing and decreasing the volume of the combustion space within the chamber, comprising a control piston the inner end of which forms a portion of a wall of the combustion chamber and is movable outwardly and inwardly in respect to the chamber, a cylinder for said control piston, said cylinder above the head of the control piston being filled with and confining a body of fluid, the cylinder being provided with an outlet, a normally closed valve controlling said outlet, yieldable means holding the valve against opening only in response to a predetermined degree of pressure exerted upon it by the confined fluid, fluid reception and conducting means into which fluid in the cylinder can when the valve is open substantially free of opposition rapidly escape, the fluid reception means comprising a receptacle immediately adjacent the outer valve and having sufficient capacity to insure the said absence of opposition of escape of the fluid discharged through the valve, means constantly in open communication with the cylinder for delivering fluid to the cylinder to move the control piston inwardly when a drop in combustion pressure occurs, the control piston being provided with an extending head portion of a reduced diameter and of a size to fit within the control cylinder outlet to provide a dash pot action when the control piston head approaches the end of its outward travel, the control piston beneath its head being of reduced diameter to provide a circumferential overhang which in combination with the inner end of the control piston cylinder establishes a dash pot action when the control piston closely approaches the end of its inward travel, and said fluid delivery means operating to deliver fluid to the cylinder at a pressure less than the highest pressure obtained in the combustion chamber.

References Cited in the file of this patent

UNITED STATES PATENTS

| | | |
|---|---|---|
| Re. 18,595 | Wilson | Sept. 13, 1932 |
| 1,167,023 | Schmidt | Jan. 4, 1916 |
| 2,142,621 | Tsuneda et al. | Jan. 3, 1939 |
| 2,260,982 | Walker | Oct. 28, 1941 |
| 2,419,450 | Howard | Apr. 22, 1947 |
| 2,467,568 | Rosaen | Apr. 19, 1949 |

FOREIGN PATENTS

| | | |
|---|---|---|
| 467,960 | France | Apr. 9, 1914 |
| 798,013 | France | May 8, 1936 |
| 857,026 | France | Apr. 8, 1940 |